E. P. SOMMERS.
WINDSHIELD ADAPTER FOR AUTOMOBILES.
APPLICATION FILED AUG. 8, 1919.

1,411,753.  Patented Apr. 4, 1922.

Inventor:
EDWARD P. SOMMERS,
by Mack & Silsberg
Attorneys

UNITED STATES PATENT OFFICE.

EDWARD P. SOMMERS, OF LOS ANGELES, CALIFORNIA.

WINDSHIELD ADAPTER FOR AUTOMOBILES.

1,411,753.      Specification of Letters Patent.      Patented Apr. 4, 1922.

Application filed August 8, 1919. Serial No. 317,352.

*To all whom it may concern:*

Be it known that I, EDWARD P. SOMMERS, a citizen of the United States, and a resident of Los Angeles, in the county of Los Angeles and State of California, have invented new and useful Improvements in Windshield Adapters for Automobiles, of which the following is a specification.

This invention relates to and has for its object the provision of means for converting automobile windshields of the character and type commonly used on Ford automobiles into rain vision and ventilating windshields such as are used on cars of more expensive types.

In the non-ventilating type of windshields such as mentioned above a pair of glass panels are provided, one above the other, and the lower panel is stationarily held in brackets attached to the body of the car while the upper shield is pivotally supported on the upper edge of the lower shield and has its axis about midway between the two panels. It will be understood that in such a structure, the upper panel is hinged at its lower edge and is thus rendered movable rearwardly and downwardly, so that when it is so moved the entire upper portion of the shield space is open. It will be obvious that under such conditions and with such a structure, the rain and wind will enter the car from the front when ventilation is afforded and this type of shield is therefore objectionable.

It is a further object of my invention to provide an adapter attachable to non-ventilating types of windshields whereby proper relation may be afforded and also whereby the elements will be excluded from the car when the car is so ventilated.

Another object of my invention is to provide in connection with my adapter means for attaching and supporting glass deflector shields at the sides of the main windshield. Other objects may appear as the description progresses.

I have illustrated the principal features of my invention and shown one practical embodiment thereof in the accompanying drawing, forming a part of this application, in which, Fig. 1 is a front elevation of a windshield of the non-ventilating type having my adapters and deflector shields attached thereto for use.

Similar characters of reference are employed in the specification and throughout the several views of the drawings for indicating the same and like parts.

Figure 5:
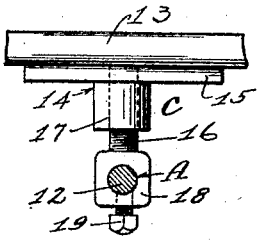
Fig. 5 is a plan of my adjustable top holder for attaching the front end of the top to the upper portion of the windshield.
Figure 2:
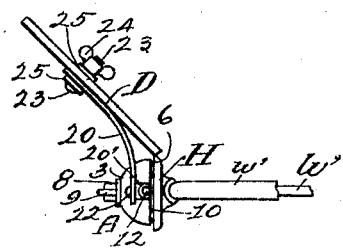
Fig. 2 is a fragmentary top plan of the same.
Figure 3:
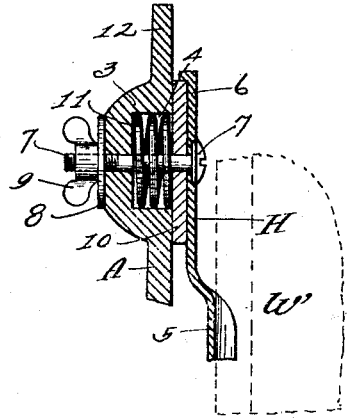
Fig. 3 is an enlarged section of the hinged joint for the same.
Figure 4:
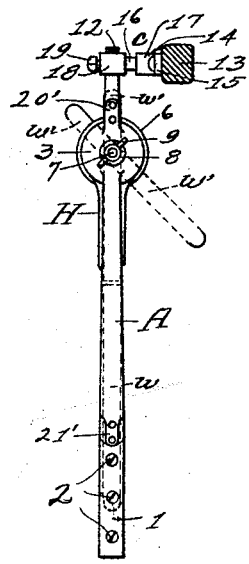
Fig. 4 is an end elevation of the structure shown in Fig. 1, in which the upper shield panel is disposed at an angle relative to the lower panel.
Figure 1:
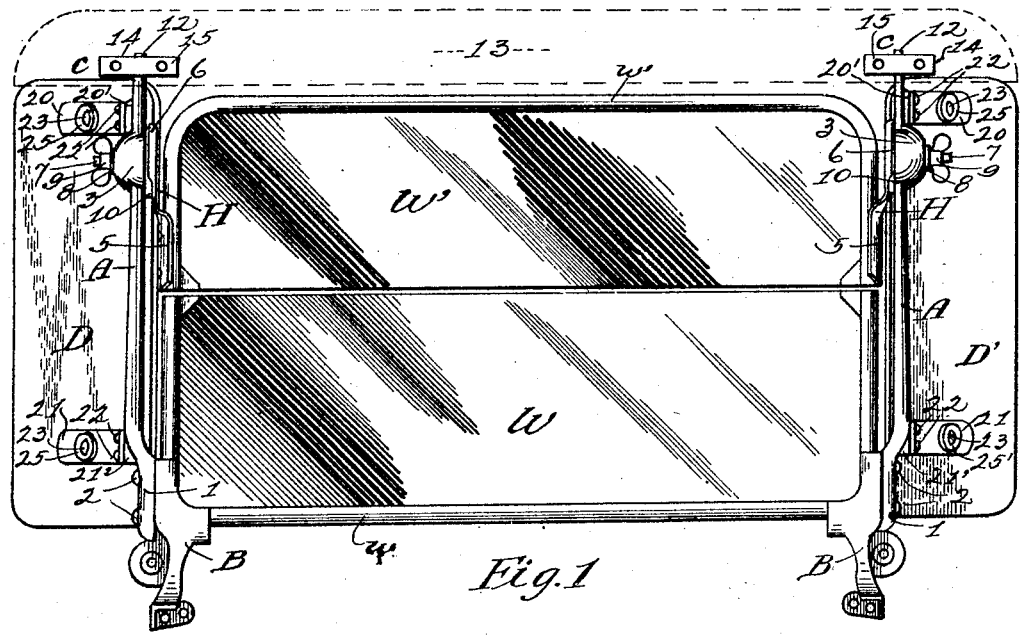

The well known form of non-ventilating windshield comprises a lower glass panel W, held in a metal frame $w$, and an upper glass panel W' held in a metal frame $w'$, the lower frame being stationarily held on the car body by means of suitable brackets B, B, and the upper panel being pivoted to the lower frame so as to be moved backwardly and downwardly relative thereto.

My special adapters, which may be modified to fit different types of windshields, are in the form of standards A, A, and the lower ends 1, 1, thereof, are formed to fit the surfaces of the brackets B, B, to which they are adapted to be attached by means of screws or bolts 2, 2. Two or three of the screws or bolts 2 may be provided according to the number provided for attaching the brackets to the frame $w'$.

The standards are extended substantially above the upper edge of the upper windshield panel W' and have enlargements 3, 3, formed thereon provided with recesses 4. Hangers H and H', are provided for attachment to the standards A, A, the lower ends 5, 5, thereof being adapted to be attached to the outer edges and lower portions of the upper frame $w'$, while the upper ends 6, 6, thereof are pivotally attached to the enlargements 3, 3, of the standards by means of bolts 7, 7, having washers 8, 8, and wing nuts 9, 9, on their outer ends. Large washers 10, 10, of leather or the like are held between the inner surfaces of the enlargements 3, 3, and the upper ends 6, 6, of the hangers, and springs 11, are provided in the sockets 4 of the enlargements 3, 3, for frictionally holding the upper panel in desired positions relative to the lower panel, said springs being compressed between the bottoms of the sockets 4 and the washers 10, 10.

The upper ends 12, 12, of the standards A, A, are adapted to be adjustably secured to the front top bow 13 of the automobile by means of connectors C, which include brackets 14 provided with feet 15, attachable to the rear side of the front bow 13 in lieu of the usual leather straps, and stems 16 adapted to be screwed into the body portions 17 of said brackets and having a lug 18 thereon bored to receive the ends 12, 12, of the standards. Set screws 19 may be provided for holding the lugs 18 at desired positions on the standard ends 12. It will be observed that with this type of connector the front end of the top may be adjustably secured to the upper portion of the windshield and that both vertical and horizontal adjustments are provided to insure a proper connection and fit of the parts.

Deflecting shields D and D' may be adjustably held at the ends of the main shields by means of brackets 20, 20, at the top and 21, 21, at the bottom, which are adapted to be attached to the standards A, A, by means of screws 22, secured to bosses 20', 20', and 21', 21', respectively, provided on the outsides of the standards A, A. Bolts 23, 23, extend through the outer ends of the brackets 20, 20, 21, 21, and have wings nuts 24, 24, on the outer ends thereof and washers of rubber or the like, as at 25, 25, on the opposite sides of the glass panels D and D', as shown.

With the structure thus provided, the upper shield W', may be tilted about an axis substantially above the lower shield W, so as to admit fresh air when the vehicle is in motion and exclude wind and rain. My adapter device of improved character thus affords all of the benefits of the well known types of clear vision ventilating windshields provided in high priced cars and also serves to firmly hold the top of the car in position on the windshield.

What I claim is:

1. A combined windshield and top support for vehicles comprising like standards having attaching members at their lower ends for connection with a stationary shield, supports for the movable shield pivoted to said standards substantially above the bottom of said movable shield and adjustable relative to the windshields, brackets carried on the top, connector screws connected with said brackets, and stems on the upper portions of said standards for adjustable connection with said connectors.

2. A top and windshield attaching device for vehicles including integral standards attachable at their lower ends to the stationary shield, separable hinged supports held thereon near their upper ends for carrying the movable shield, and vertically and horizontally adjustable means at the upper ends of said standards for attachment to the top of the vehicle.

3. An attaching device for the purpose described including stationary standards provided with body attaching members on their lower ends and top attaching members on their upper ends and enlargements intermediate said ends, said enlargements having recesses therein, hinge bolts extending through said enlargements, springs in said recesses, washers closing the inner sides of said recesses and bearing against said springs, and auxiliary supporting members hinged on said bolts and held in tension on said standards by means of said springs, for the purpose described.

Signed at Los Angeles, Los Angeles County, California, this 9th day of July, 1919.

EDWARD P. SOMMERS.

In presence of—
Luther L. Mack,
H. M. Brundage.